United States Patent [19]
Sjöberg et al.

[11] Patent Number: 6,106,761
[45] Date of Patent: Aug. 22, 2000

[54] METHOD FOR HEATING AND/OR CROSS-LINKING OF POLYMERS AND APPARATUS THEREFOR

[75] Inventors: Michael Sjöberg, Västeras; Jan Rydberg, Stockholm, both of Sweden; Jyri Järvenkylä, Hollola, Finland

[73] Assignee: Wirsbo Bruks AB, Virsbo, Sweden

[21] Appl. No.: 09/029,235

[22] PCT Filed: Sep. 20, 1996

[86] PCT No.: PCT/SE96/01169

§ 371 Date: Mar. 20, 1998

§ 102(e) Date: Mar. 20, 1998

[87] PCT Pub. No.: WO97/10936

PCT Pub. Date: Mar. 27, 1997

[30] Foreign Application Priority Data

Sep. 20, 1995 [SE] Sweden .................................. 9503272
Jan. 11, 1996 [SE] Sweden .................................. 9600091
Jun. 26, 1996 [WO] WIPO ....................... PCT/EP96/02801

[51] Int. Cl.[7] .............................. H05B 6/00; B29C 35/08; B29C 63/46; C08F 2/46; C08J 3/28

[52] U.S. Cl. .............................. 264/492; 522/24; 522/28; 522/60; 522/62; 522/157; 522/113; 523/130; 264/493; 264/496; 264/481; 264/476; 250/492.1; 250/493.1

[58] Field of Search .................................. 522/24, 28, 60, 522/62, 113, 157, 161, 150; 523/130; 427/508, 521; 250/493.1, 492.1, 503.1; 204/157.15, 157.6; 264/476, 481, 492, 493, 496

[56] References Cited

U.S. PATENT DOCUMENTS

| | | |
|---|---|---|
| 4,144,111 | 3/1979 | Schaerer . |
| 4,419,304 | 12/1983 | Ficke et al. . |
| 5,019,417 | 5/1991 | Northcutt . |

FOREIGN PATENT DOCUMENTS

| | | |
|---|---|---|
| 0 510 804 | 10/1992 | European Pat. Off. . |
| 0 562 706 | 9/1993 | European Pat. Off. . |
| 1 562 814 | 3/1980 | United Kingdom . |
| 2 248 669 | 4/1992 | United Kingdom . |
| 2 276 584 | 5/1994 | United Kingdom . |
| WO 84/01920 | 5/1984 | WIPO . |
| WO 87/04226 | 7/1987 | WIPO . |
| WO 94/21441 | 9/1994 | WIPO . |

*Primary Examiner*—Susan W. Berman
*Attorney, Agent, or Firm*—Browdy And Neimark, P.L.L.C.

[57] ABSTRACT

The invention relates to a process for heating polymer material, including irradiation of said polymer material with infrared radiation. In accordance with the process according to the invention the infrared radiation has wave lengths which substantially are not equal to the absorption peaks of the polymer material in respect of infrared radiation.

50 Claims, 5 Drawing Sheets

METHOD FOR HEATING AND/OR CROSS-LINKING OF POLYMERS AND APPARATUS THEREFOR

TECHNICAL FIELD OF THE INVENTION

The invention in general relates to a method for the uniform and fast heating of polymers or mixtures of polymers, inter alia to a method for cross-linking polymers, which are cross-linkable by means of heat, by means of infrared radiation, particularly to a method for the contactless cross-linking of mouldings of a cross-linkable polymer material in connection with the manufacture of the mouldings, especially in the manufacture of extruded tubes of polyethylene. The invention also relates to an apparatus for carrying out the method.

BACKGROUND OF THE INVENTION

In many applications involving treatment of polymer material there is a need of a fast and uniform, simultaneous heating of the entire polymer material. There are many ways of heating the polymer material, see the discussion below regarding cross-linking, but most of them have the common feature that they involve a heating of the surface of the material and conduction through the material. The heating thus will be slow and non-uniform since polymer materials generally are poor conductors in respect of heat.

Cross-linking, that is, the formation of spatial networks or cross-links in polymers such as polyethylene is nowadays generally carried out in accordance with two main principles.

According to a first main principle the formation of the spatial network is achieved chemically by means of functional groups, that is, chemically reactive side groups on the polyethylene chain take part in a condensation process which causes cross-links. Trismethoxy-vinylsilane is used in this process and for this reason the process is called the silane method.

According to another main principle the cross-linking is achieved by means of radicals which either may be formed by direct action of radiation energy on the polymer chain, for instance by means of irradiation with an electron beam, or with UV-radiation, or which may be formed by means of additives, cross-linking agents, such as organic peroxides or azo-compounds. In the latter case the cross-linking reaction normally is triggered by means of heat. The invention inter alia relates to this latter type of cross-linking by means of heat.

SE-B-324 450 discloses a process in which the polymer which is to be cross-linked is mixed with a cross-linking agent such as an organic peroxide before the extrusion and during or after the extrusion is heated so as to initiate the formation of a spatial network. This process has disadvantages because of the specific design thereof, primarily in the continuous manufacture of products like tubes, particularly in that the speed of manufacture will be very low.

Methods based on the transfer of heat from the tool generally have the advantage that all the peroxide will be used since the peroxide does not have time to evaporate. However, very long tools are then needed in order to allow the temperature to be raised in a degree which is sufficient to trigger the cross-linking. A consequence of this is that there is a high pressure drop in the tool, resulting in the necessity of high extrusion pressures, which in turn entails that the extruder must meet high standards—normally a so-called ram-extruder must be used. A result of long channels also is frictional problems in the tool. Attempts to solve the frictional problems have involved coating the tools with teflon and combining screw extruders with tools for instance provided with coextrusion, see e.g. WO 94/21441. In these processes, however, the coextruded surface layers may have to be removed after the extrusion.

In one process (called PEXEP) described in the Finnish laid-open specification 94106, which is substantially faster than the preceding process, an extruded tube of polyethylene is heated by direct contact with heated wheels in order to initiate the cross-linking. The heating here is mainly carried out by heating the surface and consequently involves conduction through the material. It should be noted that polymers like polyethylene are poor conductors in respect of heat. The disadvantages associated with this process are that the dimensional stability and the surface finish are less good. The PEXEP-process also has the disadvantage that the peroxide may evaporate from the surface and that for this reason it may be difficult to achieve an uniform cross-linking throughout the entire tube wall.

In another process the heating is carried out with a liquid in the form of a salt bath. The heat transfer from liquid to polymer is relatively good, but the problems with a surface finish which is less good and the poor heat conductivity of polyethylene remain.

In Plastics Extrusion Technology, Chapter 15, Cross-linking of plastics after extrusion, pp 499–500 (Hanser Publishers, Munich 1988), it is described how comparatively thick insulation on cables can be cross-linked contactlessly by utilizing vertical heating devices in the form of tubes containing hot vapour, without any risk for deformation of the insulation due to the influence of gravity. Furthermore a deformation of the surface of the insulation of the cable caused by contact with the walls of the vapour tube is avoided. The heating is however carried out utilizing conduction and for this reason must be performed under a long period of time, especially if the materials are thick, since the polymer, as mentioned above, is a poor conductor in respect of heat. The maximum temperature which may be achieved is furthermore low, about 225° C., which further increases the the cross-linking time and thereby the length of the cross-linking zone. A comparatively long part of the cable must be cantilevered in the cross-linking zone. It would thus seem that one condition is that the polymer is carried or supported by a core (the cable) in order to diminish any deformation or yielding caused by gravitation.

GB-A-1 562 814 discloses a continuous process for the manufacture and the cross-linking of cellular plastic made of polyethylene in which the polyethylene initially is mixed with peroxide and cellforming agents, whereupon, in one alternative, cross-linking in a first step is initiated by means of a limited heating obtained by means of infrared radiation after which the cross-linking is carrried out by means of the exothermic heat. In a second step the plastic is expanded by additional heating by means of hot air which simultaneously functions as a supporting air cushion.

Hiroshi Nishimura—Shunichi Takai, Corrosion protection of submarine pipeline with a wrap-around heat shrinkable tube, pp. 55–66, UK Corrosion '83; Conference; Ed.: Institution of Corrosion Science & Technology; National Association of Corrosion Engineers; Birmingham Nov. 15–17, 1983 discloses the initiation of cross-linking in polyethylene in shrinkable tubes by means of infrared radiation, the infrared radiation being adapted so as to consist of the wave lengths which substantially entirely are absorbed by polyethylene. Since the radiation essentially is absorbed, mainly the surface layer of the polymer will be heated and the remaining part of the polymer will be heated by means of conduction. The process thus is mainly suited for thin materials or manufacture at low speeds. A disadvantage with this process is the risk for overheating in the surface layer.

Short Description of the Inventive Concept

The object of the present invention is to set forth a process and an apparatus making possible a fast, contactless and uniform heating of a polymer or polymer mix (which in the following will be called polymer material), inter alia for cross-linking, so that manufacture of objects made of cross-linkable polymers can be carried out at high speeds and with a good surface finish.

In accordance with the invention this is achieved in that the polymer material is irradiated with infrared radiation having wave lengths which differ from the wave lengths which are absorbed by the polymer material in question. This means that the infrared radiation penetrates through the polymer and in this way quickly heats the moulding throughout its entire thickness. In cross-linking this means that a high speed of manufacture is made possible. Since the heating is carried out by means of infrared radiation the heating can be done entirely without contact, which results in a high surface finish. In a preferred embodiment, primarily used for cross-linking after extrusion, the zone with infrared radiation is arranged in a vertical direction from the extrusion nozzle, preferably upwardly, so that the moulding after the extrusion is fed vertically upwards through the said zone. Because of the fast and uniform heating the cross-linking proceeds quickly and the extruded moulding rapidly obtains a high rigidity (that is the material in the body or moulding passes from having been mainly viscous to being mainly visco-elastic). Since the cross-linking zone at the same time can be made short this results in that the risk for deformation or local thickening due to vertical yielding caused by gravitational forces will be small. Both the dimensional and the thermal stability thus will be high. To the extent peroxide for instance is used as a cross-linking agent, the agent does not have time to evaporate from the surface.

The above-mentioned objects of the invention are also achieved by means of an apparatus for heating mouldings provided with at least one zone with at least one source of infrared radiation, particularly for cross-linking of polymers which are cross-linkable by means of heat, the infrared radiation having wave lengths that mainly differ from the absorption peaks of the polymer in question.

Other advantageous embodiments are set forth in the dependent claims and in the other independent claims.

DETAILED DESCRIPTION OF A PREFERRED EMBODIMENT OF THE INVENTION

Figure 1:
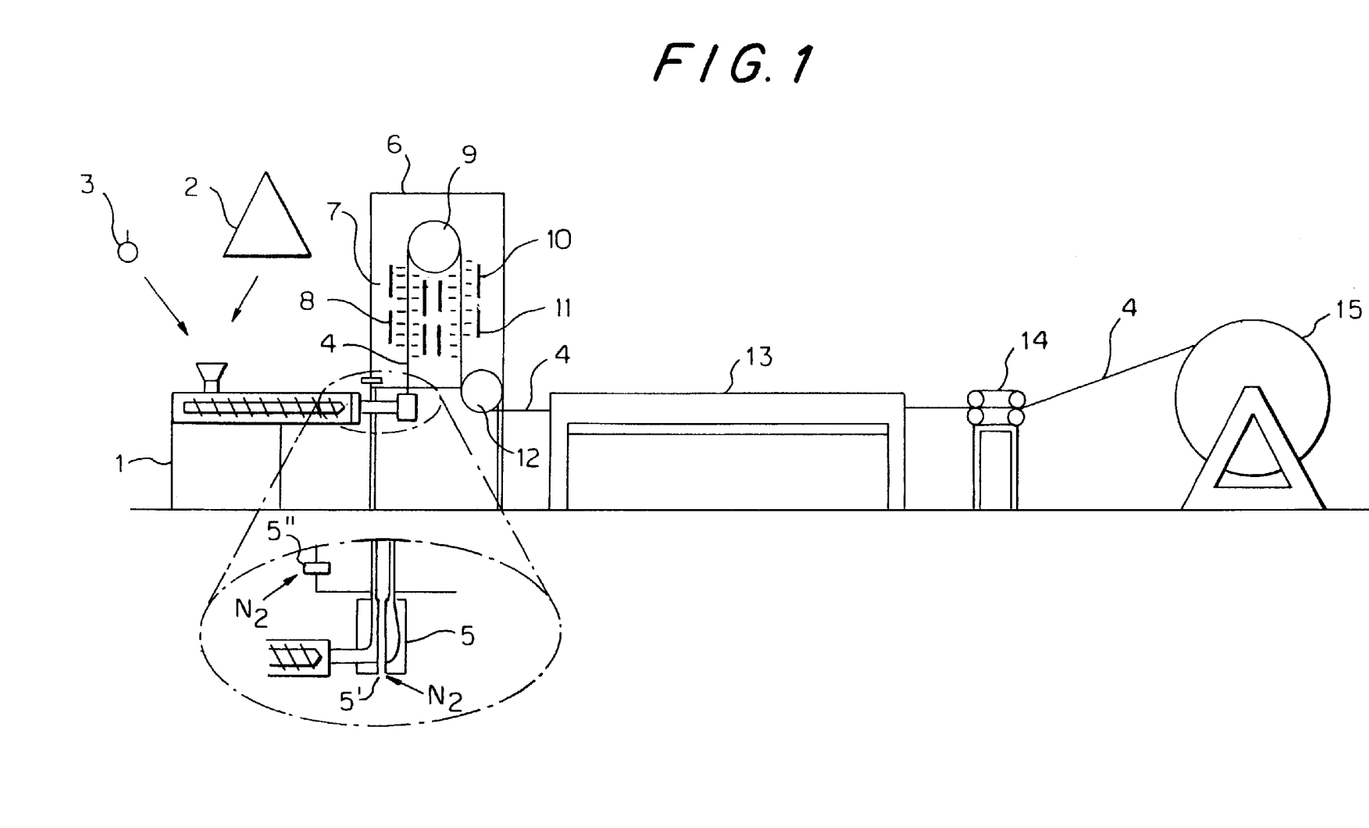
FIG. 1 shows a schematic picture of an arrangement according to the invention for extrusion and cross-linking of tubes made of plastics, FIGS. 2a and b illustrate one way of arranging infrared sources in combination with parabolic mirrors.

FIG. 1 illustrates schematically a preferred embodiment of a line for extruding and cross-linking tubes of polyethylene.

This line includes an extruder 1 in which starting materials in the form of polyethylene 2 and an organic peroxide 3, preferably an apolar peroxide which is approved for used in connection with food, are fed. For a more detailed discussion of polymer materials and cross-linking agents which may be used reference can be made to for instance SE-B-324 450 and the above-mentioned Chapter 15, Cross-linking of plastics after extrusion. Above all, it should be emphasized that polar peroxide and azo-compounds may also be used in applications which for instance do not have to meet the standards in food handling.

After heating and mixing in the extruder 1, a tube 4 is continuously formed in the angled head 5. The nozzle in the angled head is directed upwardly, so that the tube 4 is extruded vertically upwards. The angled head is located outside a cross-linking oven 6 but opens into this oven. Nitrogen or any other suitable inert gas is blown into the oven through an opening or nozzle 5" in order to prevent that the surface of the extruded tube is oxidized. Nitrogen or any other inert gas is also introduced in a manner known per se into the interior of the tube in connection with the extrusion through an opening or nozzle 5'. It is an advantage if the inert gas is at a certain overpressure in the tube. By these means the cooling of the inside may be controlled and residual products, if any, may be removed.

The tube 4 is fed vertically upwards from the angled head 5 through two zones 7, 8 comprising sources of infrared light. After the two first zones with infrared light the tube optionally is deflected 180° by means of a deflection wheel 9 in order to allow the tube optionally to be moved vertically downwards through two further zones 10, 11 provided with sources of infrared light. In these zones the material is heated by means of the infrared radiation so as to cause the material to be cross-linked. The tube is then deflected 90° by means of a second deflection wheel 12 and is then fed horizontally through a conventional cooling tub 13. A conventional tube feeding device 14 follows after the cooling tub which feeds the tube with a speed which is adjusted to the extrusion speed. The cross-linked tube is then wound onto a drum 15 in a conventional manner.

All parts of the line except the infrared zones and the vertical orientation of the tube in the oven are quite conventional and may be of any optional kind as long as they permit the extruded tube to be fed through the infrared zones. The angle head 5 may thus for instance be replaced by a deflection wheel deflecting a tube, which has been extruded horizontally, into a vertical direction.

Figure 2A:
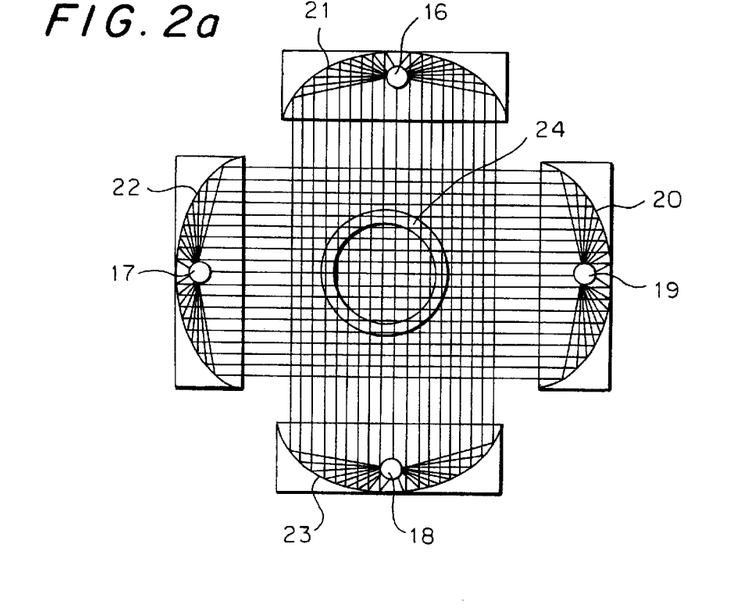
Figure 2B:
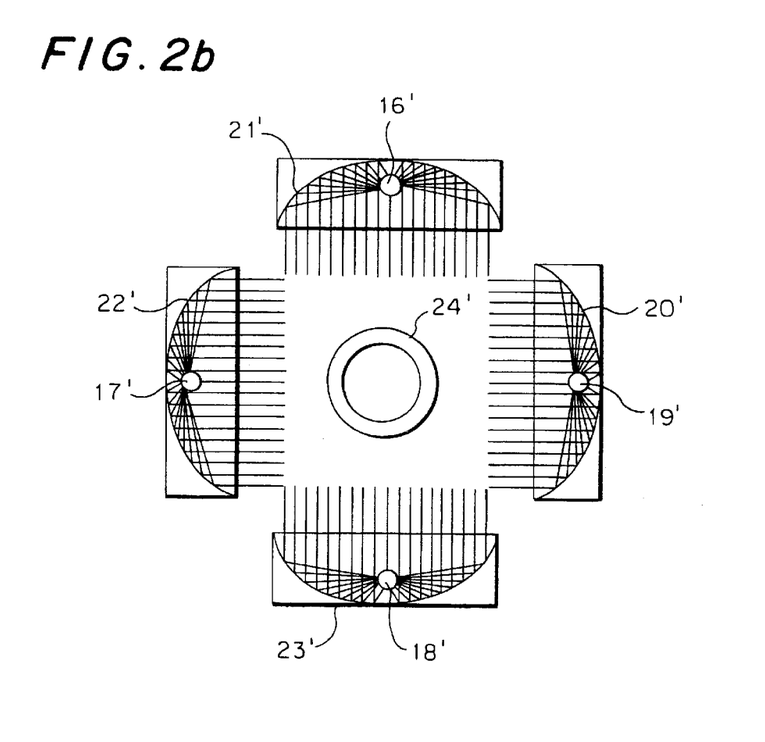

FIGS. 2a and 2b show an infrared zone in cross section. The zone comprises four elongated infrared radiators 16, 17, 18, 19 arranged symmetrically around the tube, each being located in the focal point for a respective elongated mirror 20, 21, 22, 23,, having a constant, parabolic cross section,, between said mirror and the tube. The infrared radiators may for instance consist of lamps for infrared light. As shown the respective tube 24, 24' will be irradiated from all sides with four beams of radiation consisting of parallel infrared radiation in addition to the direct radiation from the infrared radiators. Radiations passing past or through the tube will at least partly be reflected back against the tube.

The fact that the radiation beams are parallel will entail that the arrangement more easily can be used for tubes having different dimensions without any need for adjustment or rebuilding, since, as can be seen in FIGS. 2a and 2b, tubes 24 with a larger diameter and tubes 24' with a smaller diameter will be irradiated in a similar way and substantially uniformly around the entire periphery, although to some extent with different powers.

Figure 3A:
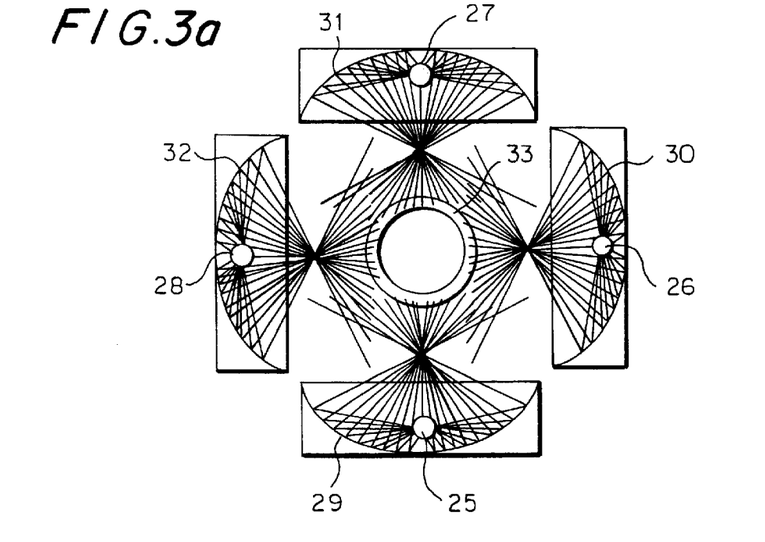
FIG. 3a illustrates a first way of arranging infrared sources in combination with elliptical mirrors.
Figure 3B:
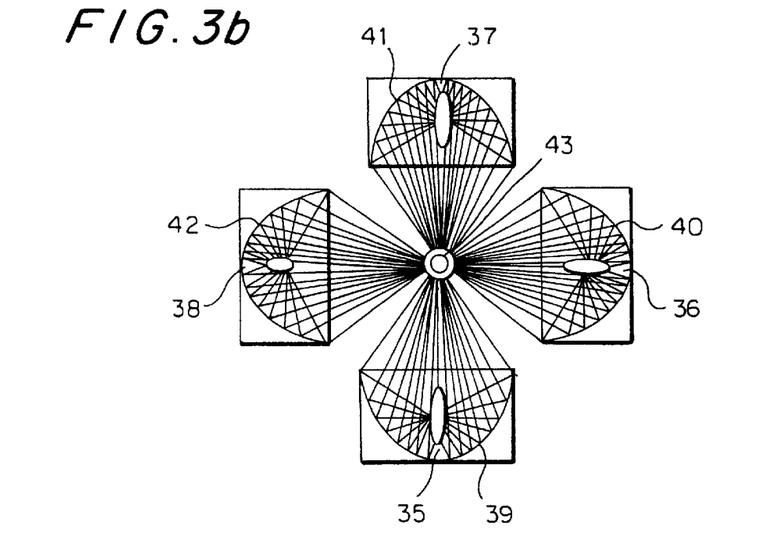
FIG. 3b illustrates another way of arranging infrared sources in combination with elliptical mirrors.

FIGS. 3a and 3b show an arrangement in which the mirrors have an elliptical cross section instead of a parabolic cross section. In FIG. 3b the ellipse upon which the shape of the mirror is based has been divided along the major axis. If the infrared radiators 25–28 are placed in the focal points of the mirrors 29–32, the reflected radiation will be focused in a point between the respective radiator and tube relatively close to the radiator and then diverge considerably. As can be seen in the Figure, this design therefore is suitable for tubes 33 having a large diameter.

In FIG. 3b the ellipse upon which the shape of the mirror is based has been divided along the minor axis. This means that the reflected radiation from the infrared radiators 35–38, which are located in the focal points of the mirrors 39–42, will be focused in a point located relatively far from the infrared radiators, which in turn means that the reflected radiation from all four mirrors substantially can be focused in a point within the tube. This will give a high concentration of the reflected radiation on the tube in tubes 43 having a small diameter.

Mirrors having an elliptical shape are thus somewhat more sensitive with regard to the dimensions of the tube than mirrors having a parabolic shape.

In mirrors having an elliptical shape at least a part of the radiation which passes past or through the tube also is reflected back towards the tube, above all from the opposite mirrors.

The mirrors are preferably coated with pure gold, which reflects up to 98° of incident infrared radiation. An alternative which perhaps chiefly might be used on other enclosing surfaces in the zone for infrared radiation is polished aluminium which reflects up to 90° of incident infrared radiation.

As mentioned introductorily it is very important that the material in the tube is heated uniformly across the entire cross section. This has been difficult to achieve with the prior art mentioned introductorily, since materials like polyethylene are poor conductors in respect of heat. The heating power, which mainly is conveyed to the surface of the material in the prior art, in these cases either has to be high in treatments during a short period of time (=high speed of production) with the concomitant risks for degradation of the outer layers of the polymer because of local, excessively high temperatures (for instance entailing evaporation of the cross-linking agent in the surface layer) or be comparatively low during a long period of time for treatment (=low speed of production). In the latter case the treatment may of course instead be carried out for a long distance, but this entails risks relating to for instance the dimensional stability of the polymer product.

By irradiating the polymer with infrared radiation having wave lengths which differ from the wave lengths for which the polymer has absorption peaks, a more uniform heating of the material is obtained across the entire thickness thereof since the radiation passes through the material delivering a certain heating power per unit length of the material thickness, simultaneously avoiding the heavy local surface heating due to the absorption peaks. For polyethylene this for instance means the avoidance of the wave lengths corresponding to the absorption peaks A and B in the diagram in FIG. 4 which shows an example of a measurement of the transmission of infrared radiation of the polyethylene in dependence of the wave length, here expressed in $cm^{-1}$. The ranges A and B here correspond to 3.2–3.6 $\mu$m respectively 6.7–6.9 $\mu$m.

Figure 4:
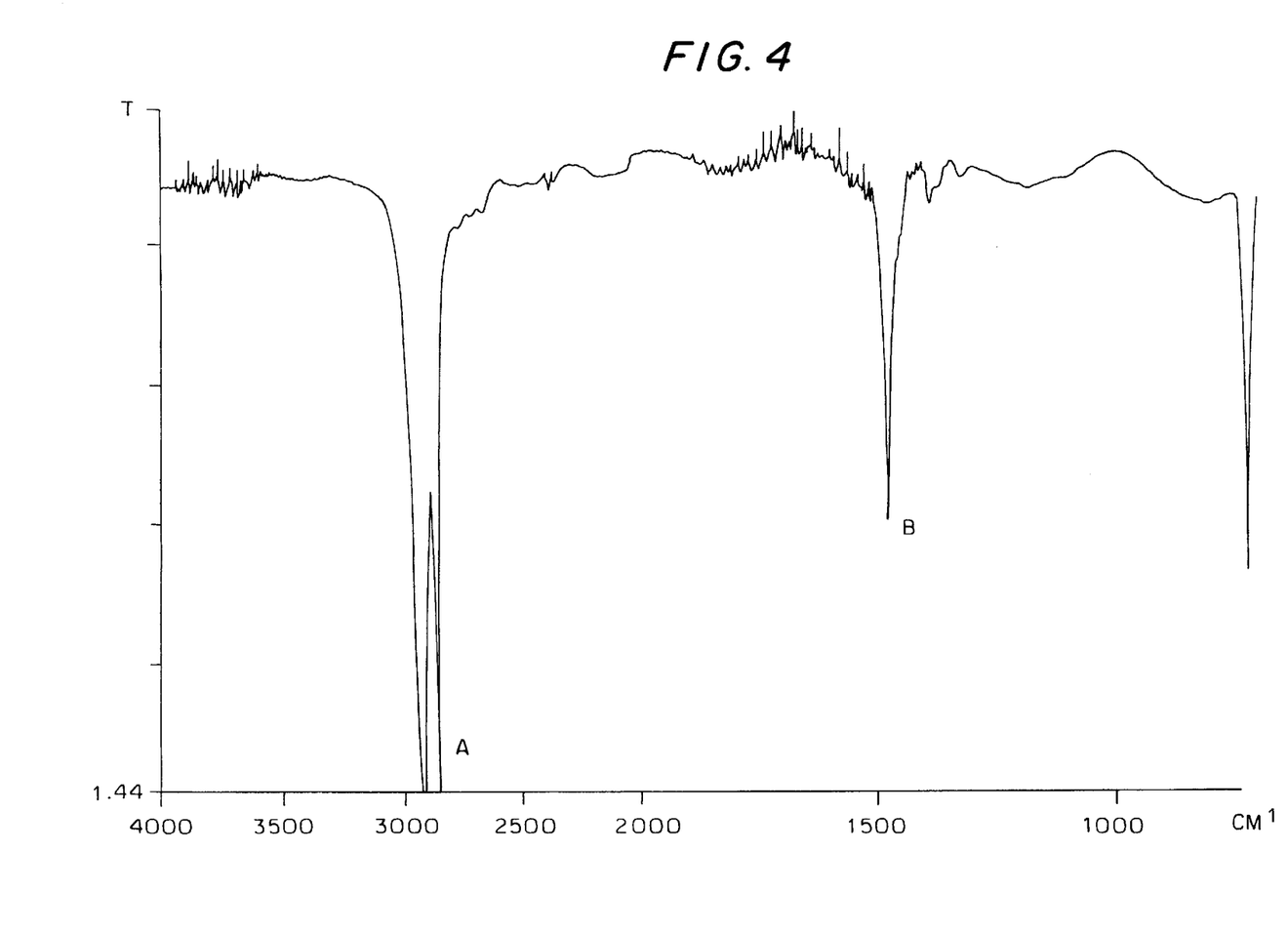
FIG. 4 shows a diagram of the transmission by polyethylene of different wave lengths of infrared radiation.

As is evident from the diagram a relatively high transmission of the infrared radiation may be obtained in dependence of the thickness of the material.

The elimination of these absorption peaks may for instance be achieved by placing a filter filtering off these peaks which is placed between the respective infrared radiator and the tube. A suitable filter material is for instance silica glass, $SiO_2$, or the glass types known under the names "Pyrex" or "Crown glass".

An alternative to filters is to use lamps for infrared light having wave lengths of about 1.2 $\mu$m as sources for infrared radiation, in this way avoiding the absorption peaks.

As can be seen in the diagram it may in some cases be simplest to entirely avoid the wave length range 2–10 $\mu$m within which most absorption peaks of polyethylene are located.

The uniform and smooth heating of the polymer material to the cross-linking temperature permits the tube, which is viscous after the extrusion, to be moved vertically and entirely without any contact and without any outer or inner support for a relatively short distance through the infrared zone. In spite of this the distance is sufficient to substantially allow cross-linking. The fact that the tube may be moved vertically results in that the gravity acts along the longitudinal direction of the tube, which, in combination with the short distance during which the material in the tube still is viscous, minimizes the risk that the tube is deformed under the distance without any contact.

As an example it can be mentioned that, with an apparatus including four infrared sources forming an infrared zone having a length of only 300 mm and having a peak value of the wave lengths around 1.2 $\mu$m, it has proved possible to produce tubes having a diameter of 15 mm and a wall thickness of 2.5 mm at a speed of 16.5 kg/h. The atmosphere in the oven was nitrogen mixed with air, that is, not an entirely inert atmosphere. The power of the infrared source furthermore was relatively limited. In spite of this the quality of these tubes with regard to dimensional stability, termal stability, surface finish and cross-linking approaches the quality of the tubes obtained with the slow process according to SE-B-324 450, whilst the speed of manufacture approaches the speed of manufacture for the "PEXEP"-method mentioned introductorily. In another example, tubes intended for tap water were manufactured with the same dimensions as the preceding ones with a dispensed mass of 35 kg/h at a melting temperature of about 175° C. and a total applied effect in two IR-zones having each four IR-lamps or 14–15 kW. With an admixture of 0.5% ditert.butylperoxide, cross-linking degrees of between 76 and 78% were obtained, which is well within the range of the desirable degree of cross-linking, 70–90%. The tubes at the same time displayed a very high surface finish both on the inside and on the outside.

It should be emphasized that the above description of a preferred embodiment of the invention only is given as a non-limiting example and that the invention of course may be varied in many ways within the scope of the attached claims. The number of infrared sources is optional as long as sources and mirrors have been arranged in such a way that the product which is to be cross-linked is irradiated from all sides. A variant could be a cylindrical tube which has a reflective inside, around the inner periphery of which a number of infrared sources are arranged symmetrically.

It should also be noted that it is conceivable to move the tube vertically downwards in the initial stage and then vertically upwards instead in the opposite directions as described above.

In the manufacture of tubes it may also be of great importance to coat the inside and/or outside of the tube with a layer comprising another polymer, preferably a thermoplastic polymer. One such method is for instance described in WO 94/21441. If this polymer is chosen in such a way that it is low-absorbing with regard to the wave length range used for the infrared radiation and has a good adhesion to the main material in the tube, the tube may be coextruded on the in- and/or outside with a thermoplastic material displaying good frictional properties in the nozzle and the cross-linking of the main material may take place without essentially influencing the surface layers, since the IR-radiation substantially passes through the surface layers without heating them but selectively heats the main material in the tube. The surface layer may also be made of polymers being impervious with regard to different substances such as chlorine or benzene. It is also conceivable to have surface layers made of materials having properties with regard to absorption which correspond to the properties of the main material in the tube since the surface layer then will be heated in a degree substantially corresponding to the degree of heating of the main material in the tube, with the result that the temperature curve through the walls of the tube substantially will remain uniform. One example of this latter concept is tubes made of crosslinked polyethylene (PEX) coated with nylon. These materials have similar properties with regard to absorption or infrared radiation.

These surface layers may also protect the extruded product against oxidation and, in cross-linking, against evaporation of the cross-linking additive.

In another alternative a tube may be coated with a thin aluminum layer on the inside obtained by extruding the tube together with a thin foil of plastic coated with a thin metal layer which for instance may have been obtained by sputtering. In this case the metal coating will function as the mirror according to the invention which reflects the infrared light. Such a reflecting layer may also be used to prevent the IR-radiation from passing through polymer layers which are located behind the reflecting layer and which it is not desirable to irradiate or cross-link.

Another possibility of arranging a mirror for reflecting the IR-radiation is to use a core having a reflecting surface at the extrusion. Such a core is particularly important in tubes having a larger diameter which may not easily be extruded vertically. The core then suitably has a length corresponding to the length of the radiation area and is coated with substances like chrome-teflon in order to give a good reflecting effect and good properties with regard to friction. The core may further be provided with means for heating/ cooling, resulting in that the core may be tempered to obtain better control of the heating or the cross-linking. In such a process there are not the problems with stick/slip-flow which occurs in a tool of the kind which for instance is used in WO94/21441.

As can be seen in our simultaneous pending application WO96/02801 which is based on SE 9503272-8, filed Sep. 20, 1995, it is also conceivable to design parts, for extrusion and/or shaping, of glass or another material which is transparent for IR-radiation. One advantage is that the material (the glass) in the transparent parts can be chosen to be made of the same material as the filter according to the invention for filtering off of the wave length being absorbed by the polymer/polymer mixture, by which means thus a uniformly distributed heating of the polymer material is achieved, another that a protective gas is not needed. This entails inter alia that a partial or complete cross-linking can be initiated already in the tool, for instance in order to ensure that the polymer chains keep a certain orientation. The transparent part may be located directly after the nozzle or before the nozzle. The latter case is to be preferred when the tool is used for the manufacture of products of oriented PEX.

Another case in which a fast and uniform heating of polymer material is desirable is the manufacture of tubes with oriented molecular chains from blanks consisting of relatively thick tubes which are expanded to the final shape. Such a process is for instance described in German patent application 2 357 210 filed Nov. 16, 1973. Polymer materials which might be used are among others PVC, PE, PEX, PP, and PET. When tubes made of PVC are manufactured, the blank is extruded, cooled and is normally tempered in water from about 20° C. to about 93° C. (90–98° C. is the orienting temperature of the material), that is mainly by means of conduction, whereupon the blank by means of a fixed inner core is expanded to the final form followed by calibration. It is however also in this case important that the temperature profile throughout the wall of the tube is uniform. Furthermore, the initial stage of a process involving a fix inner core may be difficult since the modulus of elasticity of the plastics material still will be relatively high at the maximum temperature of the water. It is thus an advantage if a temperature can be achieved in the initial stage which exceeds the maximum temperature of the water bath even if there is a risk for a slightly worse orientation in this stage. Both these possibilities exist if the tube blank instead is heated by means of IR-radiation with wave lengths which substantially are not absorbed by the polymer material, in this way considerably improving this process. The temperature then can be lowered gradually after the initial stage.

In all the above-mentioned processes the reflecting mirror may also be replaced by a material which entirely absorbs the radiation passing through the polymer material, for instance in order to regulate the degree of heating or the speed of heating.

Figure 5:
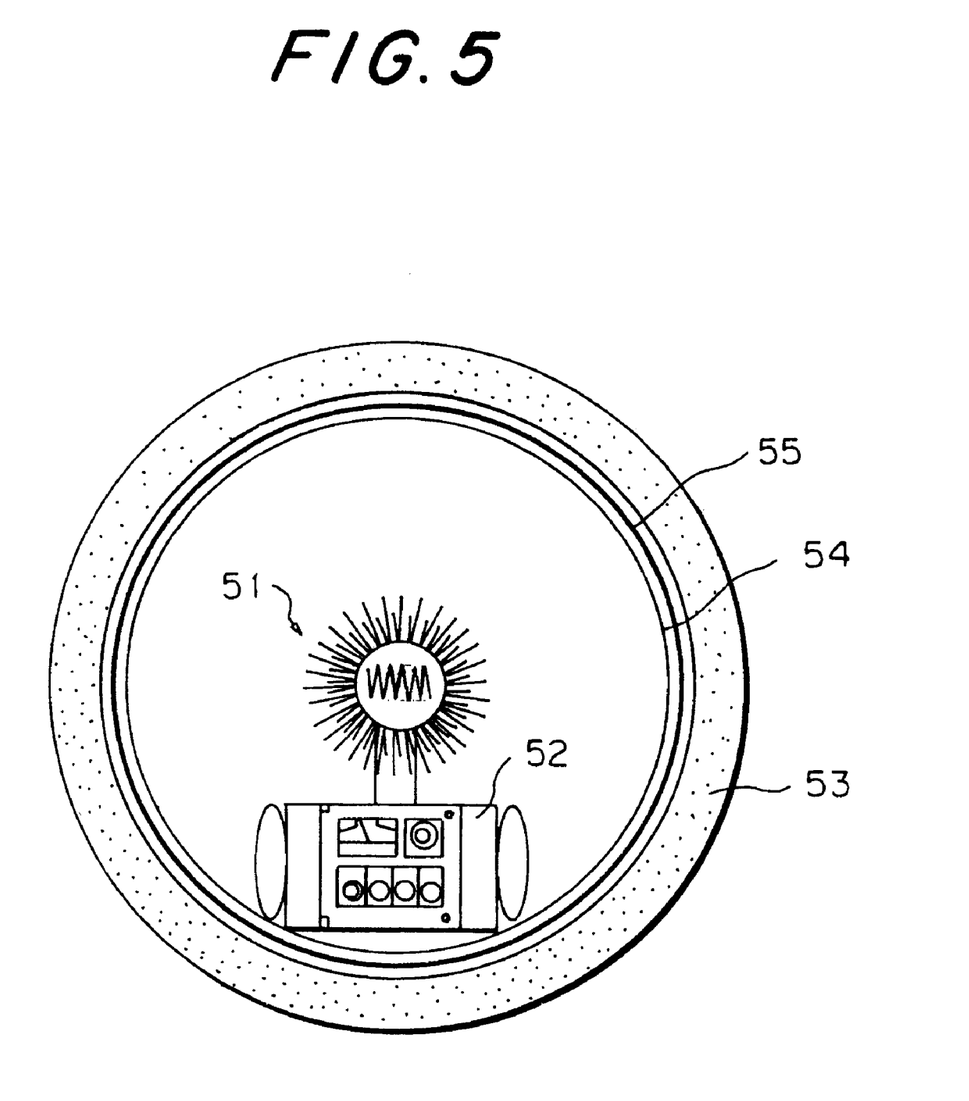
FIG. 5 shows a carriage having an infrared source for internal irradiation of tubes.

Another important field in which the inventive process may be useful is lining of pipes which are to be reconditioned by means of linings comprising folded or compressed tubes which are expanded against the pipe. The pipes may be tubes which essentially have the same form as the inside of the pipe which is to be reconditioned. The tubes are made of a polymer material, for instance PEX, which is treated or manufactured so as to have so-called memory function, that is, they revert to their original form upon heating by means of IR-radiation. The system is called "close fit" since the tube of PEX will shrink somewhat due to the cooling even if it is expanded to its original shape. Such a process is for instance described in GB-A-2 264 765. In order that the tube easily may revert to its original shape it is valuable also in this case if the polymer material is heated quickly and uniformly across the entire thickness, and for this reason a heating with IR-radiation chosen in accordance with the invention is very advantageous. The outside of the tube further may be coated with a layer of LLDPE mixed with a foaming agent which has not been reacted and which has been applied after the manufacture of the PEX-tube. The foaming agent can be made to react by means of the efficient heating which can be obtained by the choice of wave lengths for the IR-radiation according to the invention, which means that the foam which is formed can compensate for any shrinkage due to cooling. In this way, a "tight fit" system is obtained which is desirable since it will not vibrate against the walls of the outer tube caused by variations in pressure and is not sensitive to buckling caused by water which possibly may penetrate inbetween the two tube walls. In FIG. 5 an example of a movable IR-source 51 is shown, which is located on a carriage 52 provided with wheels which is movable in a pipe 53 which is to be reconditioned. On the inside of the tube the lining tube 54 can be seen with a foam layer 55 located on the outer side thereof.

In one variation which above all is suited for pipes having a larger diameter a plurality of thin, folded lining tube layers made of a weldable polymer can be used which are introduced successively and pressurized after the introduction, wherein each polymer layer is subjected to heat for forming and/or welding from a movable IR-source, see our simultaneous, co-pending application SE 9600091-4, filed Jan. 11, 1996. Preferably, layers of PEX are used, but the layers may also be made of other materials. The choice of materials and the succession of different materials may be varied in dependence of the field of use of the tube. Advantageously the IR-source has a range of wave length of 0.7–1.5 $\mu$m, preferably in the range close around 1.15 $\mu$m. One possibility may here be to provide the first layer with a layer which at least partly reflects IR-radiation, so that the radiation which passes through the subsequent layers is reflected back. In this process, a carriage similar to the one shown in FIG. 5 may be used.

It should be emphasized that the invention also has other fields of use within the scope of the appended claims. For instance the process according to the invention is very suited for heating tube ends for a subsequent shaping of these to connection sleeves.

The infrared sources may of course be of any optional kind, for instance gas flames, gas burners without an open flame, electrical resistances etc. may be mentioned as long as the emitted wave lengths can be held within the range specified, for instance directly from the source, by means of any conceivable control of the source, by means of filtering the radiation or by any other way of regulating the wave length.

The filters may of course also be of any optional kind and may be cooled if necessary.

What is claimed is:

1. Process for heating a polymer material, comprising irradiation of said polymer material with infrared radiation, wherein the wave lengths corresponding to the absorption peaks for the polymer material in respect of infrared radiation have been eliminated in the infrared radiation irradiating the polymer material.

2. Process according to claim 1, characterised in that the wave lengths corresponding to the absorptions peaks for the polymer material are filtered off.

3. Process according to claim 2, characterised in that said wave lengths are filtered off by filters made of silicon glass, or $SiO_2$.

4. Process according to claim 1, characterised in that the infrared radiation which passes through the polymer is reflected back towards the polymer.

5. Process according to claim 4, characterised in that the infrared radiation which passes through the polymer material is reflected back through the polymer material by a reflecting layer located directly against, on or in the material.

6. Process according to claim 1, characterised in that the radiation which passes through the polymer material is absorbed by a layer located on the side of the polymer material located opposite to the infrared sources in said zone.

7. Process according to claim 1, characterised in that a polymer material which is cross-linkable by means of heat, with or without cross-linking additives, is cross-linked by means of said irradiation with infrared radiation.

8. Process according to claim 7, characterised in that the polymer material comprises polyethylene.

9. Process according to claim 8, characterised in that the polymer material contains a cross-linking additive consisting of organic peroxide.

10. Process according to claim 8, characterised in that the polymer material contains a cross-linking additive which consists of azo-compounds.

11. Process according to claim 7, characterised in that the infrared radiation has wave lengths outside the wave length ranges 3.3–3.6 $\mu$m and 6.7–6.9 $\mu$m.

12. Process according to claim 11, characterised in that the infrared radiation has wave lengths outside the wave length range 2–10 $\mu$m.

13. Process according to claim 11, characterised in that the infrared radiation has a wave length which substantially is located around 1.2 $\mu$m.

14. Process according to claim 7, characterised in that the surfaces of the polymer material are flushed with nitrogen or another inert gas at the cross-linking in order to avoid oxidation of the surfaces.

15. Process according to claim 7, characterised in that the polymer material to be cross-linked is extruded continuously and is continuously fed through a zone in which irradiation with infrared radiation is carried out.

16. Process in according to claim 7, wherein the process is used for cross-linking of extruded tubes, the tubes after the extrusion being fed vertically through the or those zones in which irradiation with infrared radiation is made.

17. Process according to claim 16, characterised in that the tubes, after having been fed vertically in one direction through at least one first zone with infrared radiation, also are fed vertically in the opposite direction through at least a second zone with infrared radiation.

18. Process according to claim 16, characterised in that nitrogen or another inert gas is flushed along the outside and the inside of the tube during the irradiation.

19. Apparatus for heating polymer material, comprising at least one zone with at least one source of infrared radiation for irradiation of the polymer material with infrared radiation in which the wave lengths corresponding to the absorption peaks of the polymer material in respect of infrared radiation have been eliminated.

20. Apparatus according to claim 19, characterised in that said zone with a source for infrared radiation consists of a part of a forming tool for the manufacture of mouldings of the polymer material, said part of the tool being made of a material transparent to infrared radiation.

21. Apparatus according to claim 20, characterised in that said part of transparent material is made of a material which filters off the wave lengths corresponding to the absorption peaks of the polymer material.

22. Apparatus according to claim 19, characterized in that the power of said zones with infrared radiation being regulated in such a way that the desired degree of cross-linking of a cross-linkable polymer material is achieved.

23. Apparatus according to claim 22, characterised in that it is provided with means for feeding mouldings of cross-linkable polymer material through said zones with infrared radiation.

24. Apparatus according to claim 23, characterised in that the apparatus includes means for supplying nitrogen or another inert gas to said zone with source for infrared radiation in order to prevent oxidation of the surfaces of the moulding.

25. Apparatus according to claim 23, characterised in that said infrared zone is arranged vertically so that the moulding after the extrusion is moved vertically through the infrared zone.

26. Apparatus according to claim 25, said first zone(s) with a source of infrared radiation being arranged in a vertical direction from said extruder.

27. Apparatus according to claim 26, wherein at least one deflection device for deflecting said tube 180° is arranged above said first zones with a source of infrared radiation, so that the moulding in the form of a tube may pass vertically in the opposite direction through at least a second zone with sources of infrared radiation arranged vertically relative to said deflection device.

28. Apparatus according to claim 26, characterised in that the apparatus includes means for supplying an inert gas, along the outer side and the inner side of the tube in said zones with sources for infrared radiation.

29. Apparatus according to claim 20, characterised in that a first device for reflecting infrared radiation against said moulding is placed behind each source of infrared radiation.

30. Apparatus according to claim 20, characterised in that a second device for reflecting infrared radiation towards said moulding is placed on that side of the moulding which is located opposite each source for infrared radiation.

31. Apparatus according to claim 30 characterised in that the apparatus including an inner core coated with a reflecting surface serving as said second surface reflecting the infrared radiation when said moulding in the form of an extruded tube or another hollow product is moved over the core in order to be supported thereby, the core having a length substantially corresponding to the length of said zone of infrared radiation.

32. Apparatus according to claim 30, characterised in that said first or second device for reflecting infrared radiation consists of a mirror having a parabolic or elliptical cross-section.

33. Apparatus according to claim 20, characterised in that said source of infrared radiation includes at least one infrared lamp.

34. Apparatus according to claim 33, characterised in that two or more infrared lamps are arranged symmetrically around the moulding in said zone for infrared radiation.

35. Apparatus according to claim 20, characterised in that the apparatus further includes an extruder for extrusion of the moulding, said extruder being arranged before said zone for infrared radiation.

36. Apparatus according to claim 20, characterised in that filters filtering off the wave lengths corresponding to the absorption peaks for the polymer material to be cross-linked are arranged between each source of infrared radiation and the moulding.

37. Apparatus according to claim 36, characterised in that said filter comprises silicon glass, $SiO_2$.

38. Apparatus according to claim 19, characterised in that the wave length for said infrared source or lamp substantially is 1.2 µm.

39. Process for reconditioning pipes, including the introduction of a lining tube into the pipe which has a length corresponding to the part of the pipe which is to be reconditioned, the lining tube comprising one or several layers of cross-linked polyethylene and having an outer diameter being smaller than the inner diameter of the pipe, the lining tube being expanded against the walls of the pipe, characterised in that the lining tube is heated by means of infrared radiation in which the wave lengths corresponding to the absorption peaks of the layers in respect of the infrared radiation have been eliminated.

40. Process according to claim 39, characterised in that at least one of the layers comprises cross-linked polyethylene, the lining tube, which has an outer diameter which is less than the outer diameter the lining tube had at the cross-linking, has a so-called memory function so that the lining tube expands outwardly against the walls of the pipe to be reconditioned upon heating by means of said infrared radiation.

41. Process according to claim 39, characterised in that said lining tube is coated with a non-expanded, expandable material the outside of which by means of said infrared radiation is heated to foaming temperature and which in foamed condition fills any space between pipe and lining tube.

42. Process according to claim 39, characterised in that the lining tube is subjected to an internal overpressure by means of an inert protective gas, which contributes to the expansion and which is maintained by means of a small gas flow removing any residues from the reactions.

43. Process according to claim 39, characterised in that the lining tube comprises one or several thin layers, each layer being expanded against the wall of the pipe to be reconditioned by means of an inner overpressure, and being heated by means of said infrared radiation so that the layer is formed and/or welded against the preceding adjacent layer or against the wall of the pipe.

44. Lining tube for a process according to claim 40, comprising cross-linked polyethylene having been heated by infrared radiation in which wave lengths have been eliminated corresponding to the absorption peaks which polyethylene has in respect of infrared radiation.

45. Tube according to claim 44, characterised in that it has an outer diameter which is less than the outer diameter after the cross-linking of the tube.

46. Tube according to claim 44, characterised in that the tube on its outer side is provided with a layer forming a foam which not yet has been reacted.

47. Process for manufacturing an oriented tube of polymer material, the tube being heated to a suitable orienting temperature and then expanded and cooled, wherein said tube is heated to the suitable orienting temperature by infrared radiation in which the wave lengths corresponding to the absorption peaks of the polymer material have been eliminated.

48. Process according to claim 47, characterised in that the tube by means of the infrared radiation in an initial stage is heated to a somewhat higher temperature than the ideal orientation temperature in order to decrease the modulus of elasticity of the material in the initial stage, whereupon the temperature successively is lowered to said suitable orientation temperature.

49. Composite tube comprising at least one outer layer, at least one intermediate layer, and an inner layer, said intermediate layer consisting of polyethylene, wherein said outer and said inner layer comprise a plastics material forming a barrier against oxygen and having a low permeability in respect of peroxide and/or reaction residues of peroxide, said intermediate layer of polyethylene being uniformly cross-linked across the entire thickness of the outer layer by infrared radiation in which the wave lengths have been eliminated corresponding to the absorption peaks polyethylene has in respect of infrared radiation.

50. Composite tube according to claim 49, characterised in that said layers are coextruded.

* * * * *